Dec. 21, 1965  J. W. FROST  3,224,645
PLUG-IN ATTACHED VALVED PRESSURIZED FLUID-DISPENSING
RECEPTACLES
Filed Nov. 29, 1963                                   9 Sheets-Sheet 1

INVENTOR.
JOHN W. FROST
BY
ATTORNEY

Dec. 21, 1965   J. W. FROST   3,224,645
PLUG-IN ATTACHED VALVED PRESSURIZED FLUID-DISPENSING
RECEPTACLES
Filed Nov. 29, 1963   9 Sheets-Sheet 2

INVENTOR.
JOHN W. FROST
BY
*John L. Diehl*
ATTORNEY

Dec. 21, 1965  J. W. FROST  3,224,645
PLUG-IN ATTACHED VALVED PRESSURIZED FLUID-DISPENSING
RECEPTACLES
Filed Nov. 29, 1963  9 Sheets-Sheet 3

INVENTOR.
JOHN W. FROST
BY
ATTORNEY

INVENTOR.
JOHN W. FROST
ATTORNEY

Dec. 21, 1965 J. W. FROST 3,224,645
PLUG-IN ATTACHED VALVED PRESSURIZED FLUID-DISPENSING
RECEPTACLES
Filed Nov. 29, 1963 9 Sheets-Sheet 5

INVENTOR.
JOHN W. FROST
BY
ATTORNEY

Dec. 21, 1965    J. W. FROST    3,224,645
PLUG-IN ATTACHED VALVED PRESSURIZED FLUID-DISPENSING
RECEPTACLES
Filed Nov. 29, 1963    9 Sheets-Sheet 7

INVENTOR.
JOHN W. FROST
BY
ATTORNEY

Dec. 21, 1965     J. W. FROST     3,224,645
PLUG-IN ATTACHED VALVED PRESSURIZED FLUID-DISPENSING
RECEPTACLES
Filed Nov. 29, 1963     9 Sheets-Sheet 8

INVENTOR.
JOHN W. FROST
BY
ATTORNEY

INVENTOR.
JOHN W. FROST

BY

ATTORNEY

United States Patent Office 3,224,645
Patented Dec. 21, 1965

3,224,645
PLUG-IN ATTACHED VALVED PRESSURIZED
FLUID-DISPENSING RECEPTACLES
John W. Frost, 512 E. Parkway Blvd., Appleton, Wis.
Filed Nov. 29, 1963, Ser. No. 329,341
9 Claims. (Cl. 222—182)

This application is a continuation-in-part of application Serial No. 129,814, filed August 7, 1961, having the same title, now abandoned.

This invention relates to a device comprising an appliance for dispensing a fluid and utilizing the potential energy stored in the fluid by reason of said pressurization, and particularly relates to such a device comprising a pressurized valved receptacle containing a fluid under pressure and more particularly relates to means for maintaining such a receptacle as part of such a device.

Appliances which dispense a fluid such as butane, "Freon" or the like and utilize the potential energy of the fluid which it has by reason of being contained under pressure in a container include stove burners, torch burners, lamp burners, gas-operated horns (normally referred to as air horns), and certain carburetion systems for internal combustion engines. In the burners, the energy of the fluid is utilized to induce a flow of ambient air in conjunction with the gas is utilized to resonantly vibrate a diaphragm or to cause resonant motion of a portion of ambient air to produce audible sound waves. In carburetors, the energy in the fluid is utilized to provide atomization of the fluid as it leaves the jet.

Such applicances are well known, and the use of pressurized receptacles in conjunction with such appliances as storage containers for the fluid utilized in the appliance is also well known.

However, simple means of incorporating such receptacles into such appliances has been desired and is provided by this invention as the object thereof.

Other objects will become apparent from the drawings and from the following detailed description, in which it is intended to illustrate the applicability of the invention without thereby limiting its scope to less than that of all equivalents which will be apparent to one skilled in the art. In the drawings like reference numerals refer to like parts and:

Figure 1:
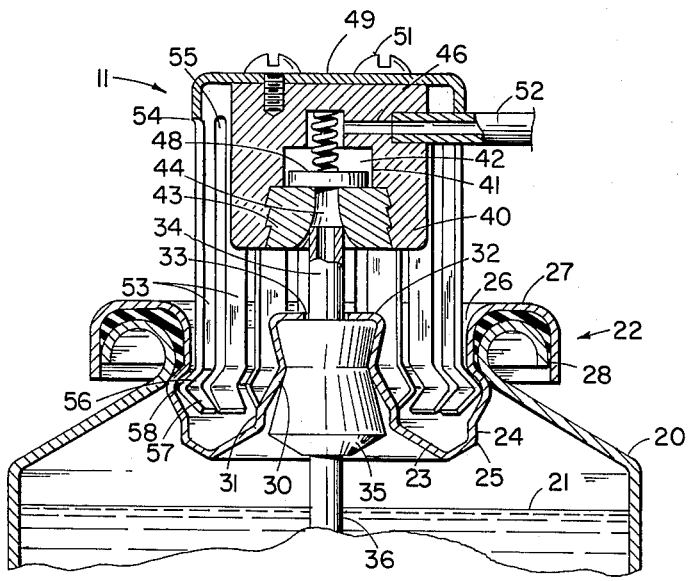
FIGURE 1 is a cross-sectional view of one embodiment of the device of the invention.

Referring now to FIGURE 1, receptacle 20 may contain fluid 21 under pressure and is provided with a dished metal closure member 22 having a horizontally extending annular bottom 23 and outer circular portion 24 extending upwardly from the outer edge 25 of annular bottom 23 and extending inwardly at its upper portion 26 to terminate at its upper peripheral portion 27 with a crimped seal 28 to the body of receptacle 20. Member 22 has inner portion 30 extending upwardly from the inner edge 31 of annular bottom 23 and a substantially annular top portion 32 having hole 33 in the center thereof through which tubular member 34 extends from valve 35 to dispense fluid 21, which enters valve 35 through tube 36.

Figure 2:
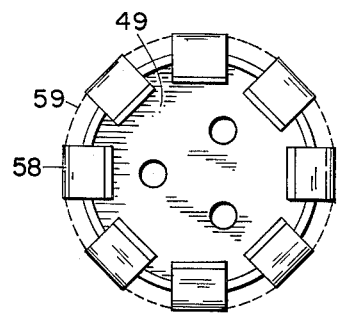
FIGURE 2 is a bottom view of a portion (part 49) of the embodiment of FIGURE 1.

In accordance with the invention, apparatus is provided to maintain receptacle 20 in engaged relation as part of any one of a large number of appliances, of which a few representative types are described hereinbelow. As shown in FIGURES 1 and 2, a portion of such appliance may be receiver member indicated generally as 11, which may comprise body 40 having inner wall 41 which defines space 42 within the body and orifice member 43 having orifice 44 to receive the upper end of tube 34; orifice member 43 may be attached to body 40 in any suitable manner. Tube or duct 46 may extend from space 42 outwardly through the outer wall of body 40 and thence to other parts of the appliance as described hereinafter.

A check valve indicated generally as 48 may be provided in space 42 to seat on the rear portion of member 43 to close orifice 44.

Orifice 44 provides a communicating passage or duct from the interior of receptacle 20 through dip tube 36, thence through valve 35, thence through the interior of tube 34, thence through orifice 44 to space 42, and communication is provided between another part of the appliance and space 42 by duct 46 in body 40 and tube 52 attached thereto.

A four-page brochure published by the Risdon Manufacturing Co., Aerosol Division, Naugatuck, Connecticut, bearing the legend "6400 Series Aerosol Can Valve" on the first page and the headings "Price List No. 201" and "Effective March 1, 1962" on the rear page illustrates a valve such as valve 35 as shown in FIGURE 1.

Flange 49 may be attached to body 40 in any suitable manner, such as by screws 51; flange 49 extends outward from receiver 11 and may extend thence downwardly as shown. Attached in a circle to the periphery of said flange at 54 there are provided members 53 extending downward from flange 49 and extending downward alongside receiver 11, thus defining open space 55 between members 53 and the outer surface of body 40 of receiver 11. Members 53 are free to move resiliently with respect to their points of attachment to flange 49 at 54, by resilient bending without permanent deformation of the material of which flange 49 and members 53 are made; thus, they may move into and out of space 55 moving toward and away from body 40 in unhindered relation to body 40. Each of members 53 is provided near its bottom end with outwardly extending portion 56 and inwardly extending portion 57 to define outwardly extending protruding portion 58; portions 58 preferably define a circle co-axial with the axis of orifice 44; this circle indicated by broken line 59 in FIGURE 2 is preferably greater than the interior diameter of portion 26 of member 22 when protruding portions 58 are not engaged with receptacle 20, as shown in FIGURE 2.

As shown in FIGURE 1, portion 58 and the outer surface of portions 56 engage portion 26 of member 22 to hold receptacle 20 and receiver 11 in engaged relation.

Figure 3:
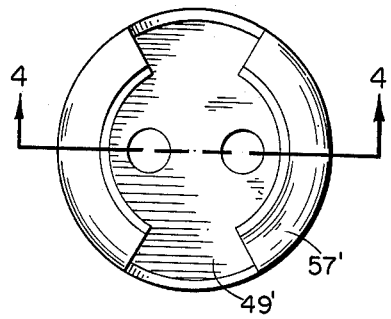
FIGURE 3 is a partially cutaway bottom view of a modification of FIGURE 2.
Figure 4:
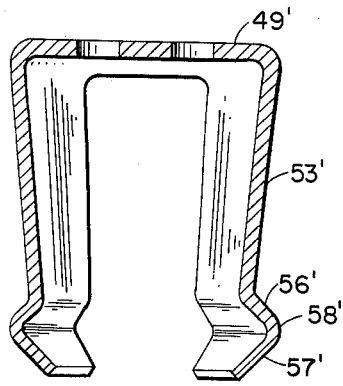
FIGURE 4 is a cross-sectional view taken on line 4—4 in FIGURE 3.

In FIGURES 3 and 4 there is shown a modification of a portion of the device of FIGURE 1 wherein only two members 53′ corresponding to members 53 are provided, each being somewhat circular in cross section rather than rectangular in cross-section as are members 53. Each of members 53 extends downwardly from a flange 49′ and thence extends outwardly at 56′ and inwardly at 57′ to provide outwardly protruding portions 58′ which define a circle which may be co-axial with the axis of orifice 44.

Figure 5:
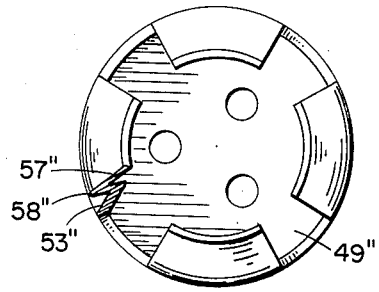
FIGURE 5 is a partially cutaway bottom view of another modification of FIGURE 2.

In like manner, an embodiment may be provided as shown in FIGURE 5 wherein four members 53″ are provided, corresponding to members 53′; members 53″ may extend downwardly from flange 49″, thence outwardly and thence inwardly at 57″ to provide outwardly protruding portions 58″ which define a circle which may be coaxial with the axis of orifice 44.

Figure 6:
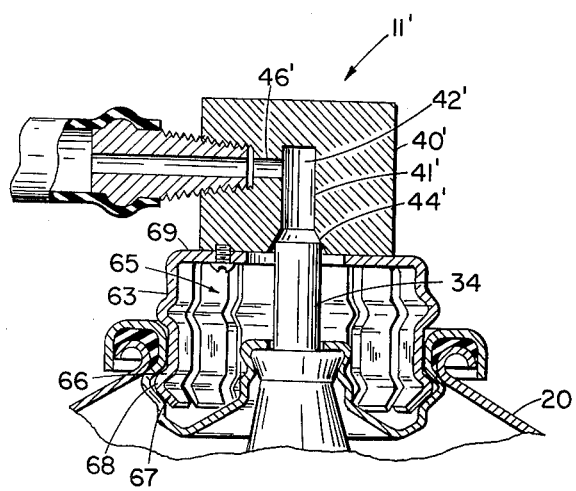
FIGURE 6 is a cross-sectional view of another embodiment of the device.

In FIGURE 6 there is shown another embodiment wherein member 40′ provides both the body and orifice member of receiver 11 indicated generally as 11′; it is provided with orifice 44′ to receive tube 34 of receptacle 20 and with inner wall 41′ defining interior space 42′ and with passage 46′ extending from space 42′ to a portion of the appliance which is not shown. Flange 69 may extend from and be attached to body 40′ by any suitable means such as by screws as shown. Members 63 may extend downwardly from flange 69 and define an open space 65 between members 63 and tube 34. Each of members 63 near its bottom extends outwardly at 66 and inwardly at 67 to provide outwardly protruding portion 68 which defines a circle which may be co-axial with the axis of orifice 44′ and preferably also with the axis of the dispensing orifice provided by the interior of tube 34.

Figure 7:
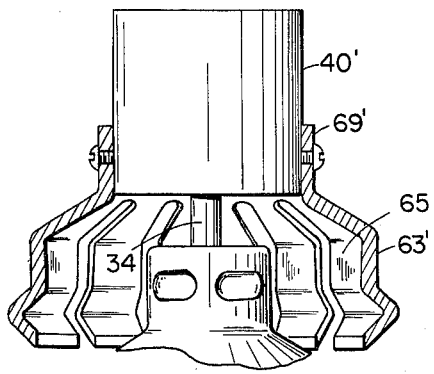
FIGURE 7 is a cross-sectional view of a modification of the embodiment of FIGURE 6.

In the embodiment of FIGURE 7 flange 69′, which extends outwardly from body 40′ and members 63′, is somewhat different in shape than the corresponding member 69 and 73 of FIGURE 6. Members 63′ provides space 65 between tube 34 and members 63′.

Figure 8:
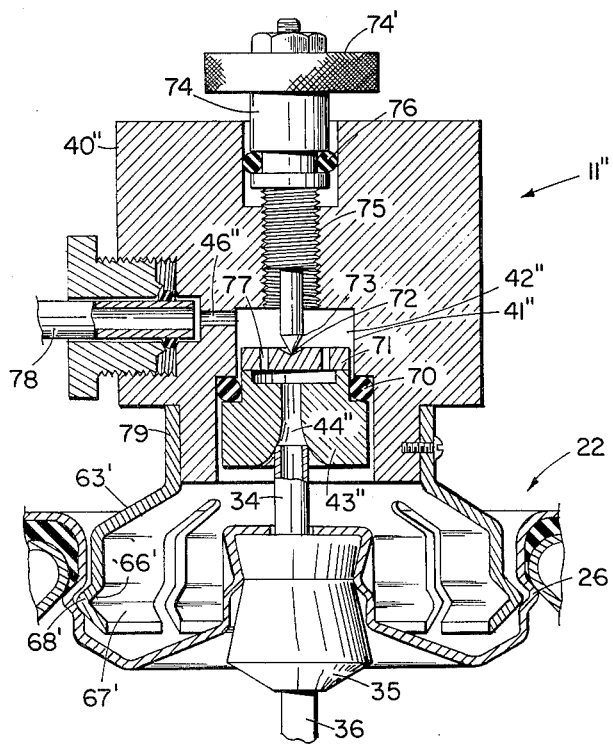
FIGURE 8 is a cross-sectional view of another embodiment of the device.

As shown in FIGURE 8, receiver 11″ comprises body 40″, orifice member 43″, having orifice 44″, which is engaged by the upper end of tube 34 and slidably received within a cylindrical interior portion of body 40″ and sealed thereto with sealing member 70, which may be an O-ring, as shown. Disc 71 has indentation 72 in the center of its upper surface to receive point 73 of valve member 74, which is threadedly engaged at 75 with body 40″ and sealed with sealing member 76 to prevent outward leakage between valve member 74 and body 40″; member 76 may be an O-ring, as shown. Disc 71 may have the same diameter as the outer diameter of the upper portion of member 43″ and is provided with a plurality of holes 77 extending upwardly therethrough. Duct 46″ may extend from interior space 42″ to the interior of tube 78, which may extend to one or more other parts of the appliance as described hereinafter. By rotation of valve handle 74′ attached to valve member 74, member 74 may be rotated and by reason of its threaded engagement at 75, it moves downwardly and thereby forces tube 34 downward to open valve 35, whereupon fluid 21 is dispensed upwardly through tube 36, valve 35, tube 34, into the appliance through orifice 44″, thence through holes 77, space 42″, and passage 46″ to one or more other parts of the appliance.

Movement of member 43″ downward causes downward movement of tube 34 by reason of receptacle 20 being engaged with body 40″ by protruding portions 68′, defined by outwardly extending portions 66′ and inwardly extending portions 67′ of members 63″, which extend downwardly from flange 79, which extends outwardly from and is attached to body 40″. Portions 68′ are engaged with part 26 of member 22.

Figure 9:
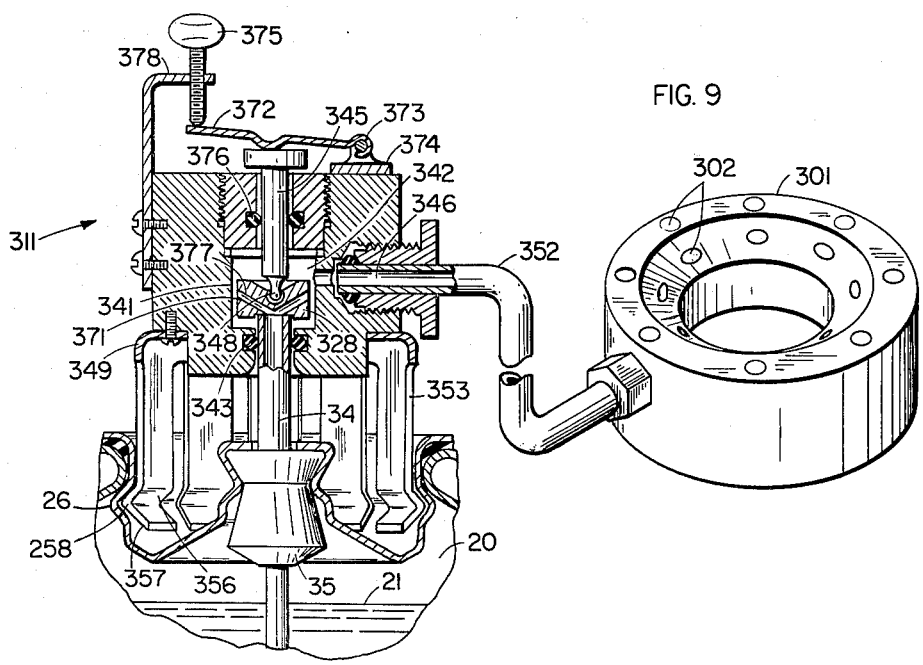
FIGURE 9 is a partially cross-sectional partially schematic perspective view of another embodiment of the device applied to a stove burner.

The appliance of FIGURE 9 comprises stove burner 301, a receiver indicated generally as 311, members 353 having portions 358, and receptacle 20 having part 26, which is engaged by portions 258, and tube 352. Tube 352 is connected to body 340 of receiver 311 by conventional means, as shown, and its interior communicates through passage 346 with interior space 342, defined by interior wall 341 of body 340. Orifice member 343, which may be an O-ring, as shown, sealingly engages the outer surface of tube 34.

Members 353 extend downwardly from outwardly extending flange 349 and are provided with outwardly extending portions 356 and inwardly extending portions 357 to define portions 358.

Means to push tube 34 downward to open valve 35 may be provided by member 345, which may be slidably mounted in body 340 and may extend downwardly through inner wall 341 and be sealed to body 340 by O-ring 376.

The lower end of member 345 may be a ball 348 received in a socket in the upper surface of member 371, which may have a socket on its lower face to receive the upper end of tube 34 and may be provided with holes 377 extending upwardly and outwardly through the member 371 communicably to provide a passage from the interior of tube 34 to space 342. Means to depress member 345 to any desired extent and thereby open valve 35 to any desired extent may comprise lever 372 extending across the top of member 345 and hingeably attached at 373 to bracket 374, which may be attached to body 340. Screw 375 may be threadedly engaged in bracket 378, which may be attached to body 340 as shown. Screw 375 is disposed to exert force downwardly on the end of lever 372 to slidably force member 345 into space 342 and toward valve 35. Combustible fluid 21 contained in receptacle 20 may be dispensed upwardly, as a liquid or a gas to valve 35, thence through the interior of tube 34, thence through holes 377, space 342, passage 346, and tube 352 to burner 301. If fluid 21 is a liquid when it leaves valve 35, it preferably is evaporated or atomized and evaporated prior to reaching holes 302 in burner 301, so that when it emerges from holes 302 it is in the form of a gas.

Figure 10:
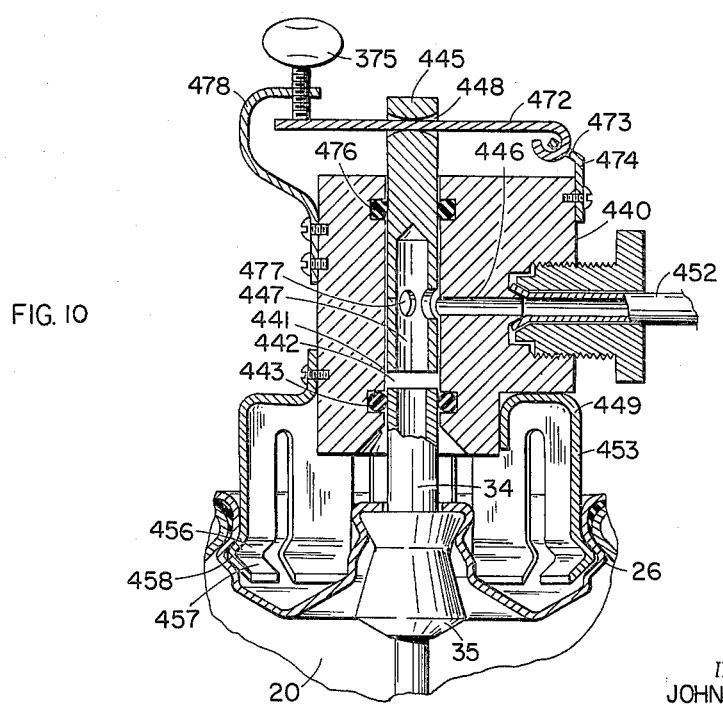
FIGURE 10 is a cross-sectional view of another embodiment of the device.

Referring now to FIGURE 10, there is shown another embodiment wherein receiver 440 is maintained in engagement with receptacle 20 by portions 458 of members 453. Members 453 extend downwardly from flange 449, which is attached to body 440, and extend outwardly at 456 and inwardly at 457 to provide portions 458 which engage portion 26 of receptacle 20. Within body 440, space 442 is defined by interior walls 441. Tube 34 extends into space 442 in sealing engagement with orifice member 443, which may be an O-ring as shown. Passage 446 extends outwardly from inner wall 441 through body 440 to the interior of tube 452, which is attached to body 440 by any conventional means as shown. Valve member 445, which may be cylindrical as shown, may extend downward through body 440 into space 442 and be maintained in sealing engagement with body 440 by any suitable means, such as O-ring 476. Member 445 may be drilled or bored to provide space 447, so that its lower portion may be essentially tubular as shown, and the wall of this tubular portion may be provided with apertures such as holes 477 extending outwardly therethrough to communicate with passage 446.

Means to force member 445 slidably downward into contact with the end of tube 34 and to then further depress tube 34 to open valve 35 may comprise lever 472 extending through hole 448 in member 445 and hingeably attached at 473 to bracket 474, which may be suitably attached to body 440. Downwardly extending screw 375 may be threadedly engaged with bracket 478 so that its lower end bears downwardly on the end of lever 472, which is on the opposite side of member 445 from hinge 473.

By thus suitably rotating screw 475, member 445 may be lowered or raised to open or close valve 35, raising of 445 being accomplished by reason of a spring, not shown, within valve 35, which biases tube 34 upwardly and thereby forces member 445 upwardly when downward pressure on lever 472 is released by backing off screw 475. Fluid is dispensed upwardly from the orifice provided by the interior of tube 34, thence through space 442, space 447, holes 477, passage 446, and tube 452 to a burner portion or other part of a suitable appliance such as a torch, stove, lantern, lamp, heater or automobile engine.

Figure 11:
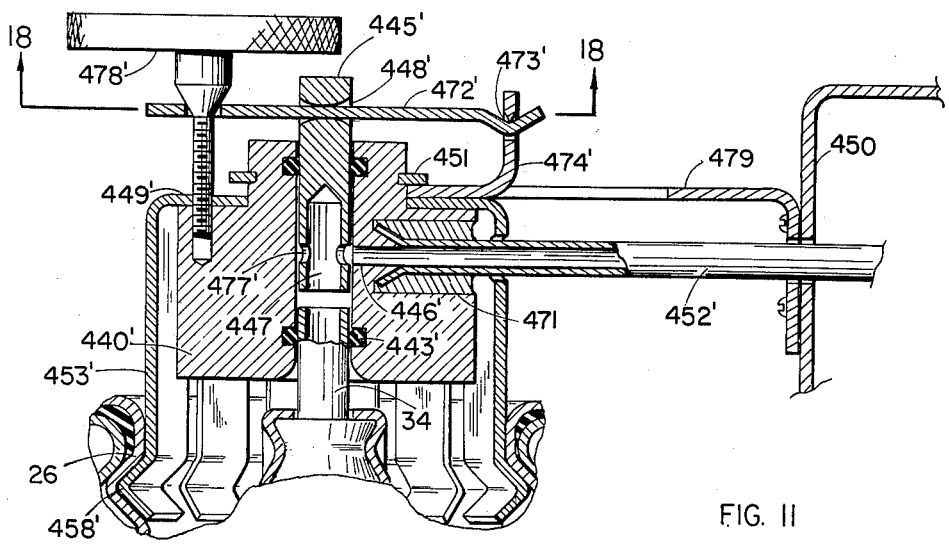
FIGURE 11 is a cross-sectional view of a modification of the embodiment of FIGURE 10.
Figure 12:
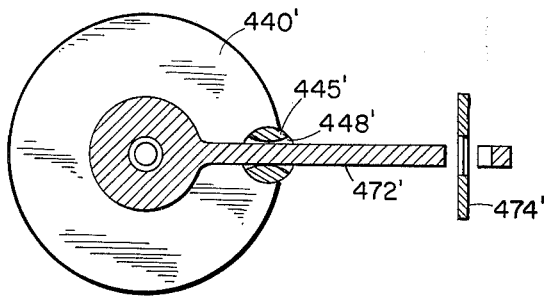
FIGURE 12 is a cross-sectional view taken on line 18—18 in FIGURE 11.

Referring now to FIGURES 11 and 12, there is shown another embodiment similar to that of FIGURE 10 and having many parts similar or identical thereto, these parts being indicated by primes. Receptacle 20 and body 440' are held together by members 453' extending downwardly from flange 449' by reason of engagement of portions 458' with parts 26 of receptacle 20. Orifice member 443 sealingly engages tube 34, the interior of which communicates through space 447' and holes 477' with passage 446', which may lead to a burner or other suitable device, through tube 452' which may be attached to body 440' by adhesive or solder 471. Body 440' may be attached to appliance frame member 450 by bracket 479 which, together with flange 449', may be secured to body 440' by snap ring 451. Bracket 474' may be provided as an upwardly extending stamped out portion of bracket 479. Hingeable engagement of lever 472', which extends through hole 448' in member 445', may be provided at 473' as a knife edge bearing. Screw 478' may extend through a hole in the end of lever 472' and be threadedly engaged in member 440'. Operation may be as in the embodiment of FIGURE 10.

Figure 13:
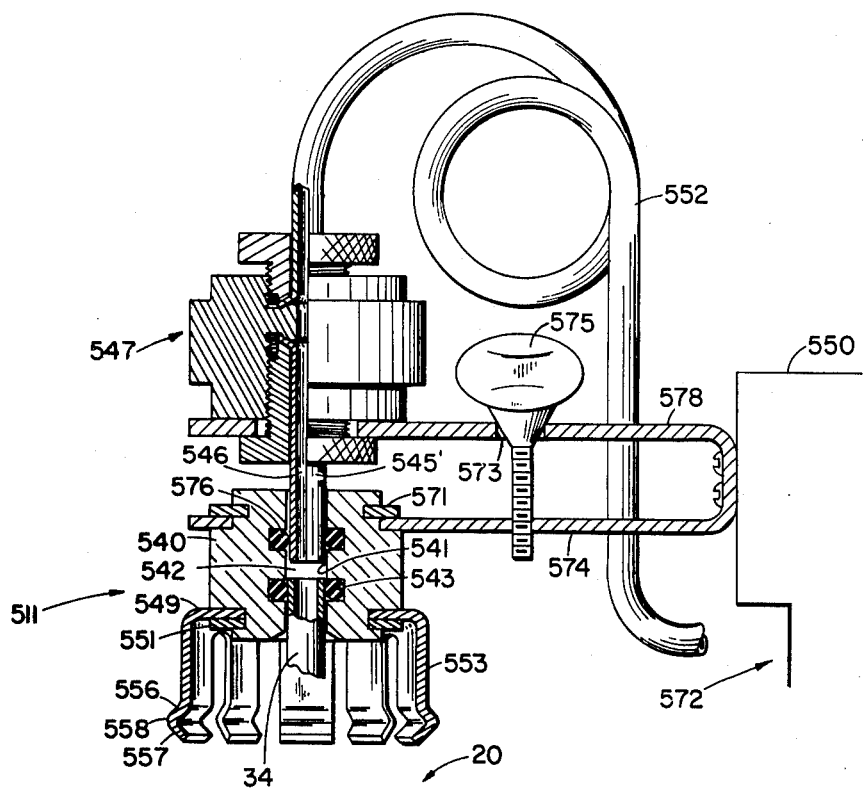
FIGURE 13 is a cross sectional view of a modification of the embodiment of FIGURE 11.

Referring now to FIGURE 13, there is shown another embodiment wherein receptacle 20 is attached to body 540 of receiver 511 by portions 558 of members 553 extending downwardly from flange 549 as hereinabove described. Flange 559 may be attached to body 540 by snap ring 551. Tube 34 is received in sealing engagement with orifice member 543 into space 542 defined by interior wall 541 of body 540.

Body 540 may be attached to frame member 550 of the appliance by bracket 574 (which is preferably slightly resilient) by snap ring 571.

Tubular member 545 may extend downward through body 540 into space 542, being slidably received in body 540 and maintained in sealing engagement therewith by sealing member 576, which may be an O-ring as shown. Member 545 may be attached to tube 552 in any suitable manner, such as by conventional connector or coupling 547, which may be attached to frame member 550 by slightly resilient bracket 578. Passage 546, within tubular member 545, communicates or provides a duct between space 542 and the interior of tube 552. Screw 575 extends through hole 573 in bracket 578 and is threadedly engaged in bracket 574. Tube 452 may be provided with a loop, as shown, or any other suitable means may be provided to make it possible for coupling 547 and body 540 to undergo translatory motion toward and away from each other. Member 545 may be forced downwardly into body 540 and into contact with the top of tube 34 to press tube 34 downwardly to open valve 35 by rotating screw 575 and thereby forcing the outer ends of brackets 574 and 578 together to force coupling 547 and body 540 to move toward each other, whereupon fluid is dispensed upward from receptacle 20 through the interior of tube 34, space 542, passage 546, and tube 552 to a burner member or other suitable portion of the appliance as a torch, stove, lantern, lamp, heater or automobile engine.

Figure 14:
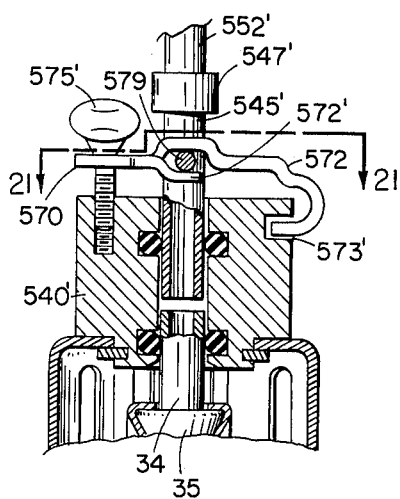
FIGURE 14 is a cross-sectional view of a modification of the embodiment of FIGURE 12.
Figure 15:
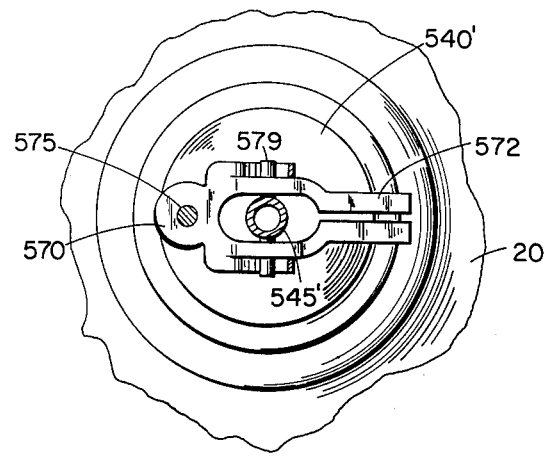
FIGURE 15 is a cross-sectional view taken on line 21—21 in FIGURE 14.

A modification of the embodiment of FIGURE 13 is shown in FIGURES 14 and 15 wherein valve operating member 545' is connected to tube 552' by soldered connector 547'.

Valve operating screw 575' extends through a hole in one end of lever 572 and is threadedly engaged in body 540', being provided with shoulder 570 to engage the edge of the hole in lever 572. Lever 572 is engaged with the upper surfaces of pins 579, which may extend laterally from member 545'. Lever 572 may be provided with extending tabs 572' to engage the lower surfaces of pins 579; its end which is opposite screw 575' may be loosely engaged in space 573' to provide for its hingeable movement with respect thereto. Operation is as with the embodiment of FIGURE 13 in that operation of screw 575' may cause members 20 and 547' to move toward each other, whereupon the lower end of member 545' presses downwardly on tube 34 to open valve 35.

Figure 16:
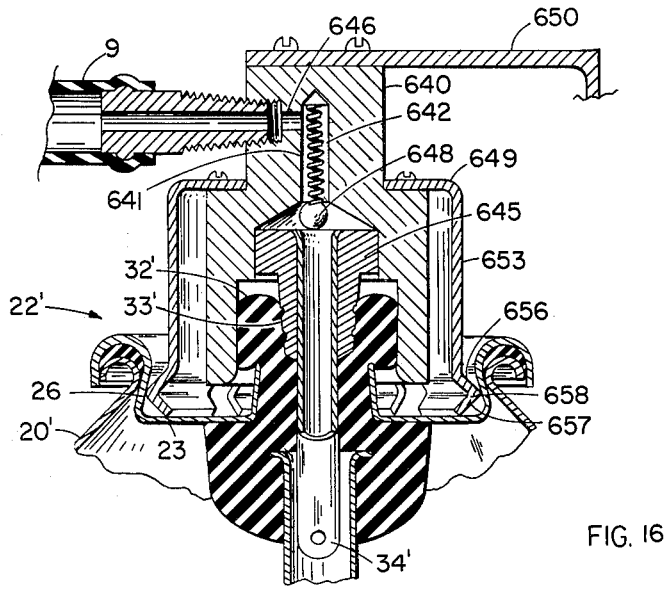
FIGURE 16 is a cross-sectional view of another embodiment.

As shown in FIGURE 16, container 20' comprises dished metal closure member indicated generally as 22', which corresponds to closure 22 with respect to parts similarly numbered and has inner portion 30' extending upward from the inner periphery 31 of bottom 23 and is provided with substantially annular top portion 32' having hole 33' in the center thereof, through which tubular member 34' extends downwardly. This type of closure is described in United States Patents 2,860,820, and 2,683,484. Receptacle 20' may suitably form part of an appliance in accordance with the invention by reason of members 653, which extend downwardly from flange 649, having outwardly protuberant portions 658 defined by outwardly extending portions 656 and inwardly extending portions 657; portions 658 engage portion 26 of member 22'. Flange 649 may extend outwardly and downwardly from body 640 as shown, being attached thereto by any suitable means, such as screws.

Body 640 is provided with downwardly extending tube or orifice member 34' and with member 645 to maintain it in place. Orifice member or tube 34' sealingly engages with portion 32' of the closure in the manner described in the previously mentioned patents. Portion 32' acts to prevent removal of fluid by leakage or otherwise from the receptacle when tube 34' is withdrawn and thus constitutes a valve which is opened by member 34'. Check valve 648 may be provided in the interior space 642 defined by interior walls 641 of body 640, and passage 646 may lead outward from space 642 to tube 652, which may lead to another part of the appliance. In place of or in addition to check valve 648, the valve of FIGURE 8 may be provided. Body 640 may, if desired, be attached to frame member 650 of the appliance.

Figure 17:
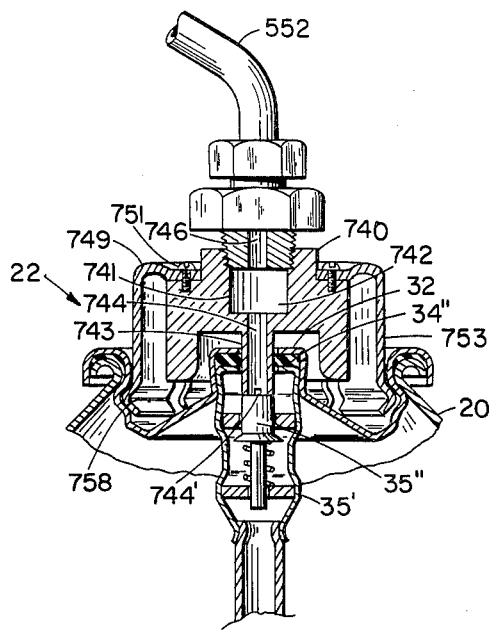
FIGURE 17 is a cross-sectional view of still another embodiment.

In the embodiment of FIGURE 17, receptacle 20 is provided with valve 35' which differs from valve 35 in that a cylindrical member must be introduced downward through the orifice provided by the hole in the center of sealing washer 34" which underlies top portion 32 of closure 22. Body 740 may be provided with downwardly extending tubular orifice member 743, which may be provided with orifice or duct 744 in the interior thereof leading from the interior of valve 35' to space 742 in the interior of body 740 defined by interior walls 741 of body 740. The end of member 743 may engage the top of a valve member such as member 35" within valve 35' to push it downwardly to open the valve and may be provided with opening 744', which may be an orifice, to provide communication between the interior of valve 35' and duct or orifice 744. The outer surface of member 743 is sealingly engaged by the inner edge of member 34". Passage 746 may lead from body 740 to tube 752, which may lead to another portion of the appliance. Body 740 may be maintained engaged with receptacle 20 by portions 758 of members 753, which extend downwardly from flange 749 attached to body 740 by snap ring 751. A valve or check valve may be provided within space 742 in the manner discussed in connection with previously described embodiments.

Due to difficulties in creating and maintaining a suitable seal at all points between passage 646 or 746 and the interior of the receptacle, the embodiment of FIG- URE 17 is less preferred than other embodiments, and the embodiment of FIGURE 16 is unpreferred.

It may thus be seen that the invention is broad in scope and includes such modifications as will be apparent to those skilled in the art and is to be limited only by the claims.

Having thus described my invention, I claim:

1. In a device comprising a pressurized receptacle containing fluid under pressure and an appliance for dispensing said fluid and utilizing the potential energy stored in said fluid by reason of said pressurization, wherein said receptacle comprises a dished metal closure member having a horizontally extending annular bottom, an outer circular portion extending upwardly from the outer edge of said annular bottom and extending inwardly at its upper portion to terminate at its upper peripheral portion with a crimped seal to the body of said receptacle, an inner portion extending upwardly from the inner edge of said annular bottom, a substantially annular top portion on said inner portion having a hole in the center thereof through which a tubular member extends, said fluid being dispensed through said tubular member;

apparatus to maintain said receptacle in engaged relation with said appliance;

said apparatus comprising as a part of said appliance a receiver having an outer wall and an inner wall defining a space therewithin, tube means extending from said appliance through said inner wall, an orifice in said receiver, said orifice communicating with said space in said receiver, means to provide communication between said space and the interior of said receptacle, so that said space is communicatingly engageable with the interior of said receptacle through said hole in said annular top portion;

a flange extending outwardly from said receiver;

a plurality of members attached in a circle to said flange and extending downward from said flange and free to move with respect to their points of attachment toward and away from said receiver in unhindered relation to said receiver, each of said members extending outwardly and thence inwardly at its lower end to define an outwardly extending protruding portion near the bottom of each member, the outer portions of said protruding portions defining substantially a circle around the axis of said orifice, said circle being greater in diameter than the interior diameter of said outer circular portion when said members are not engaged with a receptacle;

said members having said outwardly protruding portions engaged with the inwardly extending portion of said outer circular portion of said closure.

2. The apparatus of claim 1 further characterized by said flange extending from said receiver above the bottom of the receiver and by said members which extend downwardly from said flange extending downward alongside said receiver and defining in an open space between said members and said receiver.

3. The apparatus of claim 2 provided with at least two of said members extending from said flange.

4. The apparatus of claim 2 provided with at least four of said members extending from said flange.

5. The apparatus of claim 2 provided with at least eight of said members extending from said flange.

6. The apparatus of claim 1 further characterized by said flange extending substantially laterally from substantially the bottom of said receiver and by said members which extend downward from said flange extending downward substantially entirely below said receiver.

7. The apparatus of claim 1 further characterized by at least a portion of said flange extending substantially downwardly along the sides of said receiver and by said members which extend downwardly from said flange extending outwardly and downwardly from said flange.

8. The apparatus of claim 1 further characterized by said flange extending outwardly from near the bottom of said receiver and by said members which extend downward from said flange extending downward at least almost entirely below said receiver.

9. The apparatus of claim 1 further characterized by having an innermost portion of said flange extending upwardly along an outer side portion of said receiver and another innermost portion of said flange extending downwardly along an outer side portion of said receiver.

References Cited by the Examiner

UNITED STATES PATENTS

| 2,715,481 | 8/1955 | McGhie et al. | 222—394 |
|---|---|---|---|
| 2,825,325 | 3/1958 | Ross | 158—32 X |
| 2,840,032 | 6/1958 | Reeves | 116—112 |
| 2,841,694 | 7/1958 | Webster | 158—32 X |
| 2,860,820 | 11/1958 | Falligant | 158—33 X |
| 2,943,766 | 7/1960 | Orr | 123—187.5 X |

WILLIAM F. O'DEA, *Acting Primary Examiner.*

JAMES W. WESTHAVER, CHARLES SUKALO,
*Examiners.*